US006685207B1

(12) United States Patent
Blake

(10) Patent No.: US 6,685,207 B1
(45) Date of Patent: Feb. 3, 2004

(54) TRICYCLE FOOTWELL

(75) Inventor: T. Gregory Blake, Madison, WI (US)

(73) Assignee: Pacific Cycle LLC, Vernon Hills, IL (US)

( * ) Notice: Subject to any disclaimer, the term of this patent is extended or adjusted under 35 U.S.C. 154(b) by 0 days.

(21) Appl. No.: 10/160,214

(22) Filed: May 31, 2002

Related U.S. Application Data

(63) Continuation-in-part of application No. 10/160,137, filed on May 31, 2002.

(51) Int. Cl.[7] .............................................. B62K 9/02
(52) U.S. Cl. ...................... 280/282; 280/287; 280/278
(58) Field of Search ................................ 280/278, 279, 280/287, 282, 288, 638, 657, 62, 47.371, 47.315, 655.1; 297/195.1, 215.14, 215.13; 403/322.2, 325, 377, 109.3, DIG. 6; D12/112

(56) References Cited

U.S. PATENT DOCUMENTS

| | | | | | |
|---|---|---|---|---|---|
| 2,232,661 | A | * | 2/1941 | Hedstrom | 280/282 |
| 2,919,364 | A | * | 12/1959 | Carson | 313/531 |
| 4,077,351 | A | * | 3/1978 | Girona | 440/30 |
| 4,168,846 | A | * | 9/1979 | Carren | 280/278 |
| 5,779,386 | A | * | 7/1998 | Eichhorn | 403/329 |
| 6,161,860 | A | * | 12/2000 | Corneau | 280/642 |
| 6,443,469 | B1 | * | 9/2002 | Cross et al. | 280/47.4 |

* cited by examiner

Primary Examiner—Lesley D. Morris
Assistant Examiner—Tony Winner
(74) Attorney, Agent, or Firm—Andrus, Sceales, Starke & Sawall, LLP

(57) ABSTRACT

In a tricycle having a longitudinally extending frame supporting a front wheel, a pair of laterally spaced rear wheels, and a seat for a rider, a protective footwell is removably mounted to the tricycle and supports the feet of the rider in stroller mode.

24 Claims, 15 Drawing Sheets

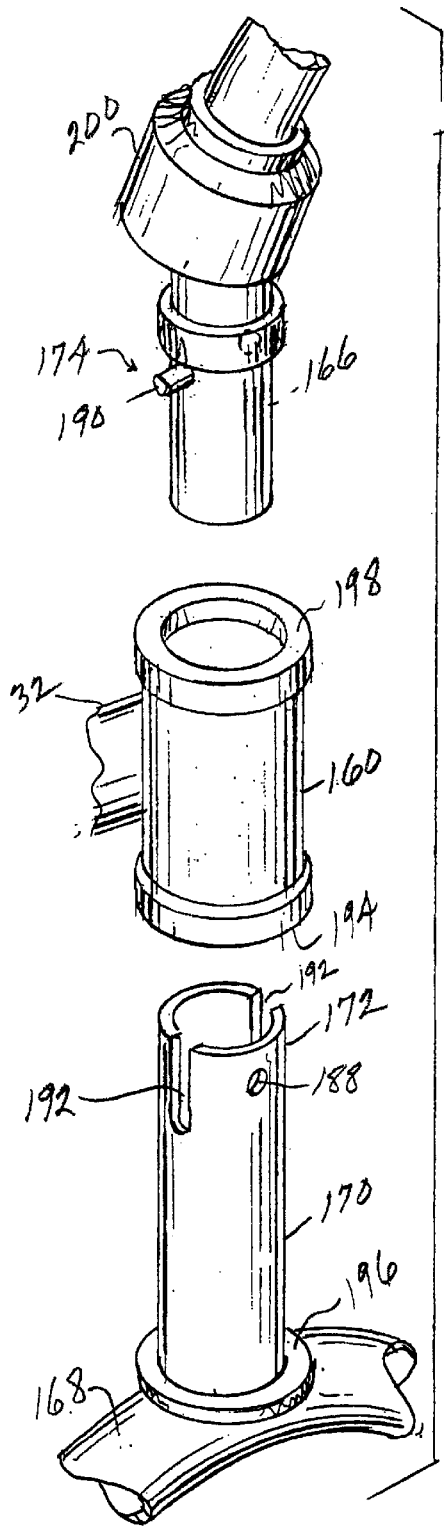
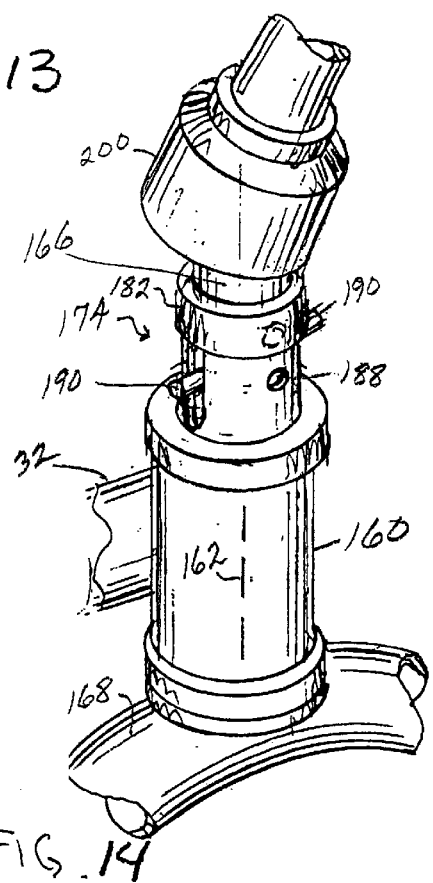
FIG. 13
FIG. 14
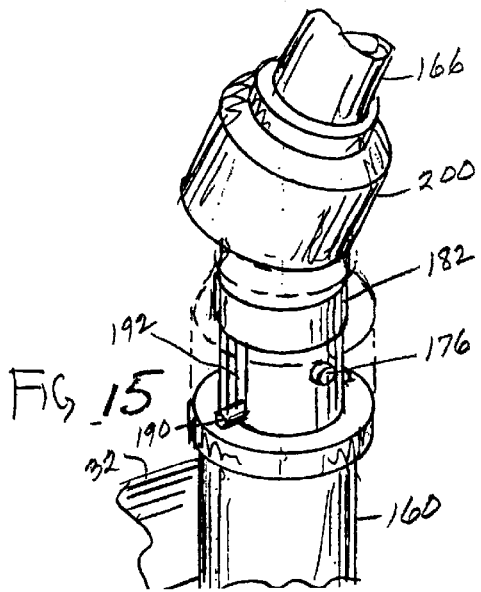
FIG. 15

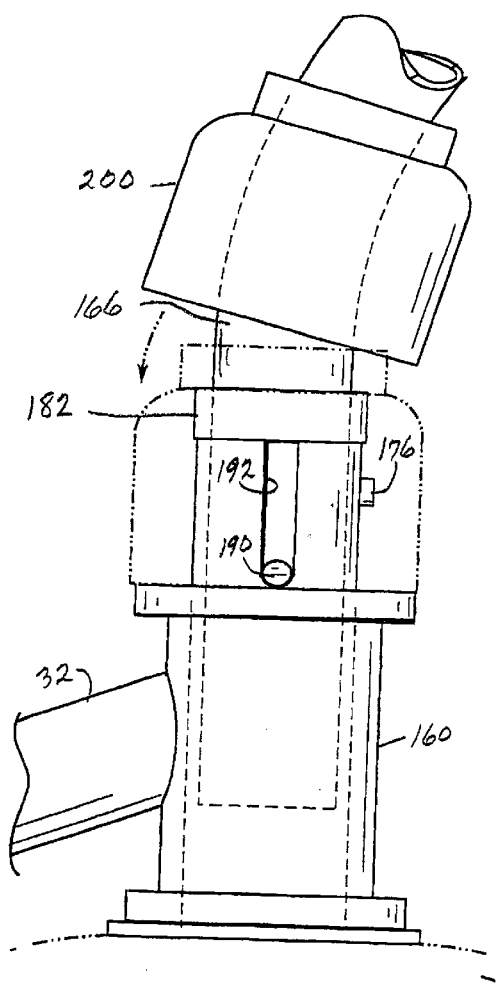
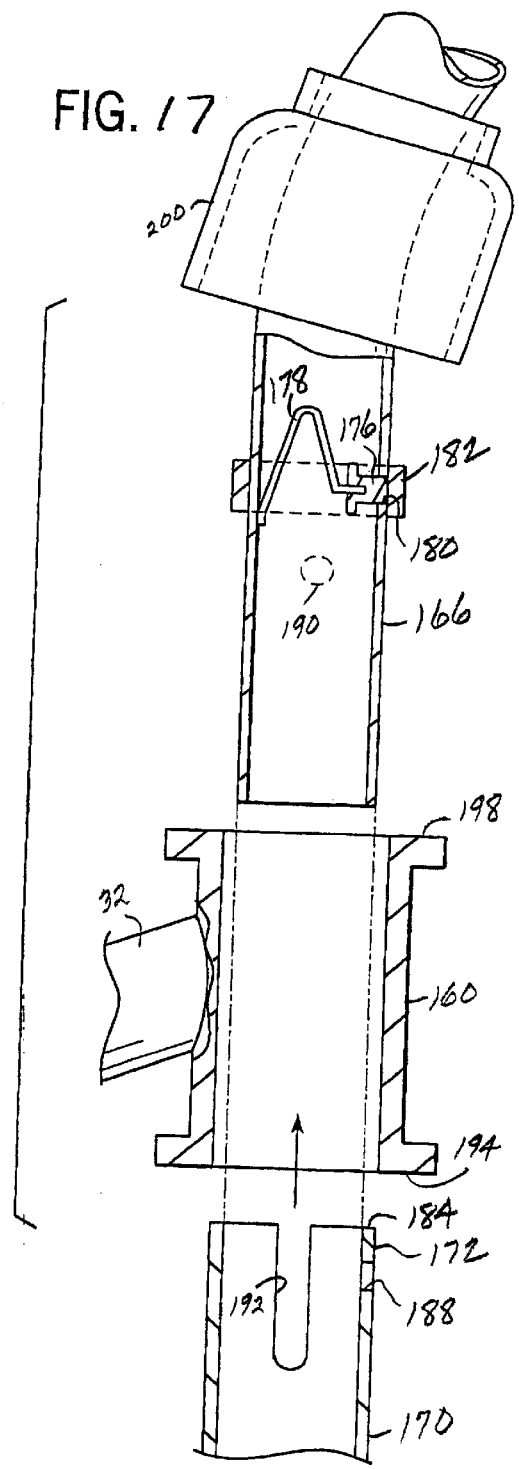
FIG. 16
FIG. 17

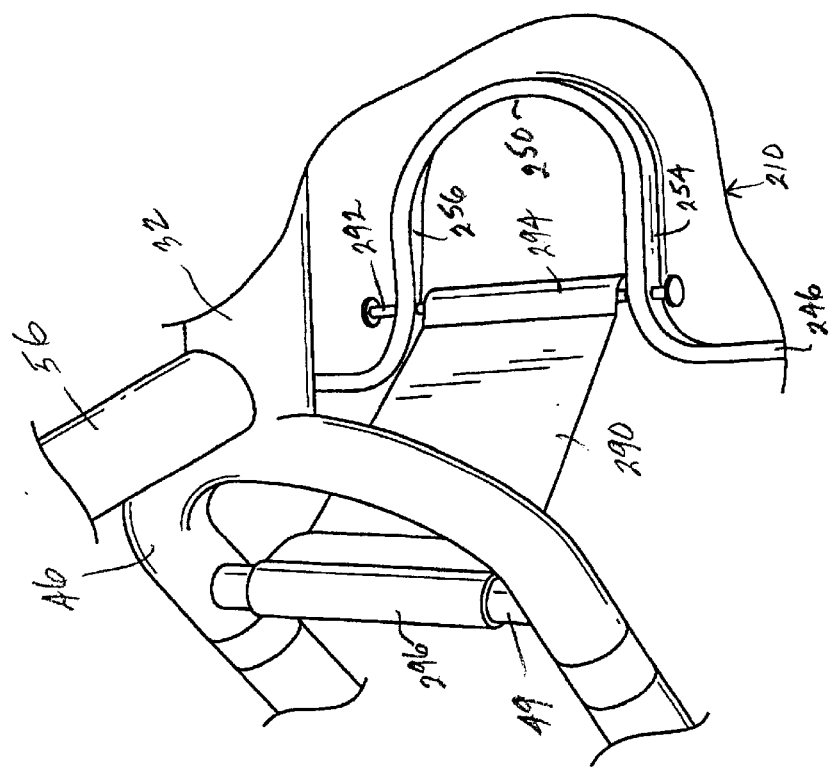

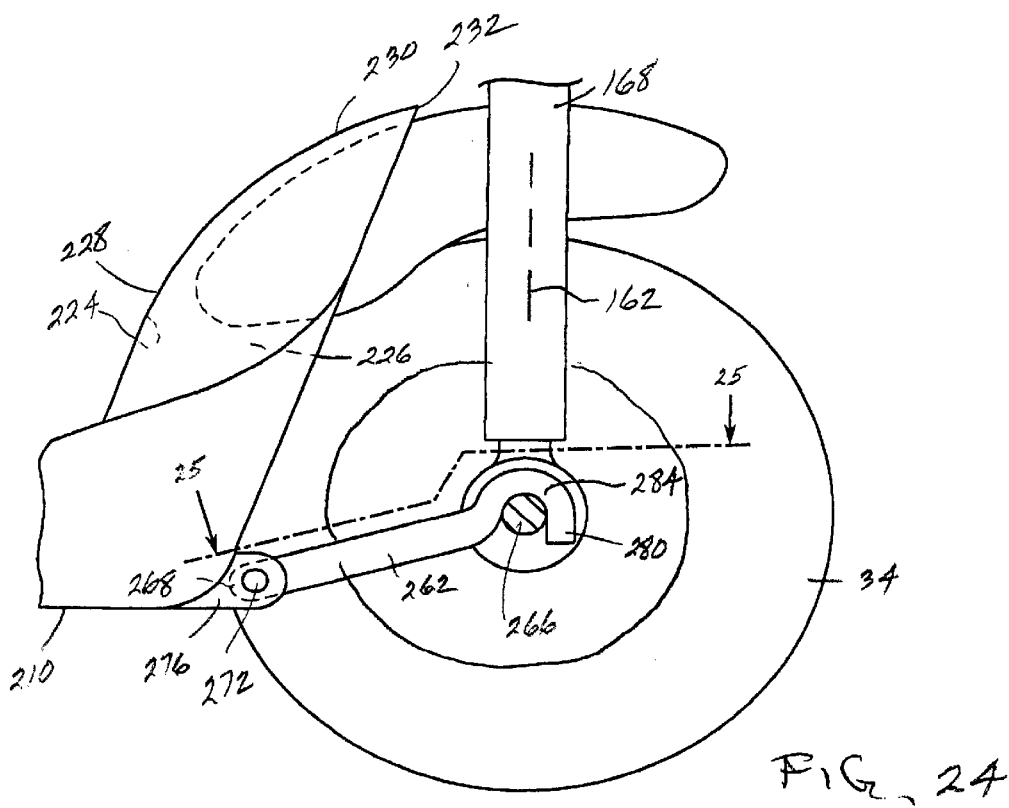
FIG_24
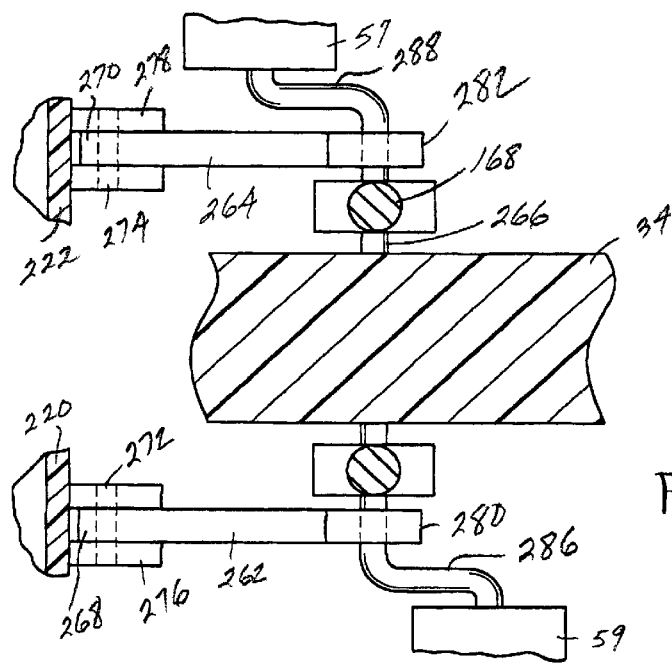
FIG_25

TRICYCLE FOOTWELL

CROSS-REFERENCE TO RELATED APPLICATION

This application is a continuation-in-part of commonly owned copending U.S. patent application Ser. No. 10/160,137, filed on May 31, 2002, incorporated herein by reference.

BACKGROUND AND SUMMARY

The invention relates to tricycles, and more particularly to tricycles with a removable protective footwell.

Parent Application

The invention of the above noted parent application arose out of development efforts directed toward simplified assembly of cycles, including tricycles and the like. Shipping a cycle in fully assembled condition is typically cost-prohibitive, and hence the cycle is usually shipped in pieces, which in turn requires assembly either at the retail outlet or at home by the consumer. There is an increasing demand for simplified, quick assembly. There is also demand for foolproof assembly, particularly by parents when the rider is a child, to ensure a safe, reliable properly assembled unit. There is also demand for relatively child-proof disassembly, i.e. preventing disassembly by the child, but permitting disassembly by an adult.

The parent invention provides a simplified, quick mounting assembly for a cycle, including a tricycle. In the preferred embodiment, the parent invention enables assembly without tools. Also in the preferred embodiment, the parent invention enables assembly only in a prescribed manner, to prevent improper installation. In preferred form, assembly is accomplished by a simple snap-in insertion step, and affirmative installation feedback is provided by an audible and tactile click confirming snap-in alignment and engagement, and proper, successful installation. Also in the preferred embodiment, disassembly is relatively child-proof. Furthermore, the parent invention also lowers shipping cost by enabling more compact, lower profile packaging in pre-assembled condition.

Present Invention

The present invention provides a protective footwell as an accessory to allow smaller children to ride on the tricycle as a stroller before they are old enough to propel themselves. The invention facilitates multiple functions simultaneously. The footwell provides a place for the child's feet, while keeping their feet protected from the spinning front wheel and pedals. The footwell locks the front wheel against steering by the child, so that the tricycle will only roll straight, and the parent can push the tricycle with a push handle and steer the tricycle by rear leverage. In the preferred embodiment, a tool-free mounting assembly enables mounting of the footwell to the tricycle without tools, and disassembly of the footwell from the tricycle also without tools. Also in the preferred embodiment, there is provided a laterally stabilized mounting assembly mounting the protective footwell to the tricycle in laterally stabilized relation stabilizing the footwell against right-left tilting in the event of uneven right-left foot pressure of the rider, e.g. a squirming child.

BRIEF DESCRIPTION OF THE DRAWINGS

Parent Application

FIG. 10 is taken along 10—10 of FIG. 1.

FIG. 13 is an exploded perspective view of a portion of the cycle of FIG. 1 illustrating a pre-assembled condition.

FIG. 14 is a view like FIG. 13 and illustrates the structure during assembly.

FIG. 15 is like FIG. 14 and illustrates the structure in assembled condition.

FIG. 16 is a side elevation view of the structure of FIG. 15.

FIG. 17 is an exploded sectional view of a portion of the cycle of FIG. 1 illustrating a pre-assembled condition like FIG. 13.

Present Invention

Figure 20:
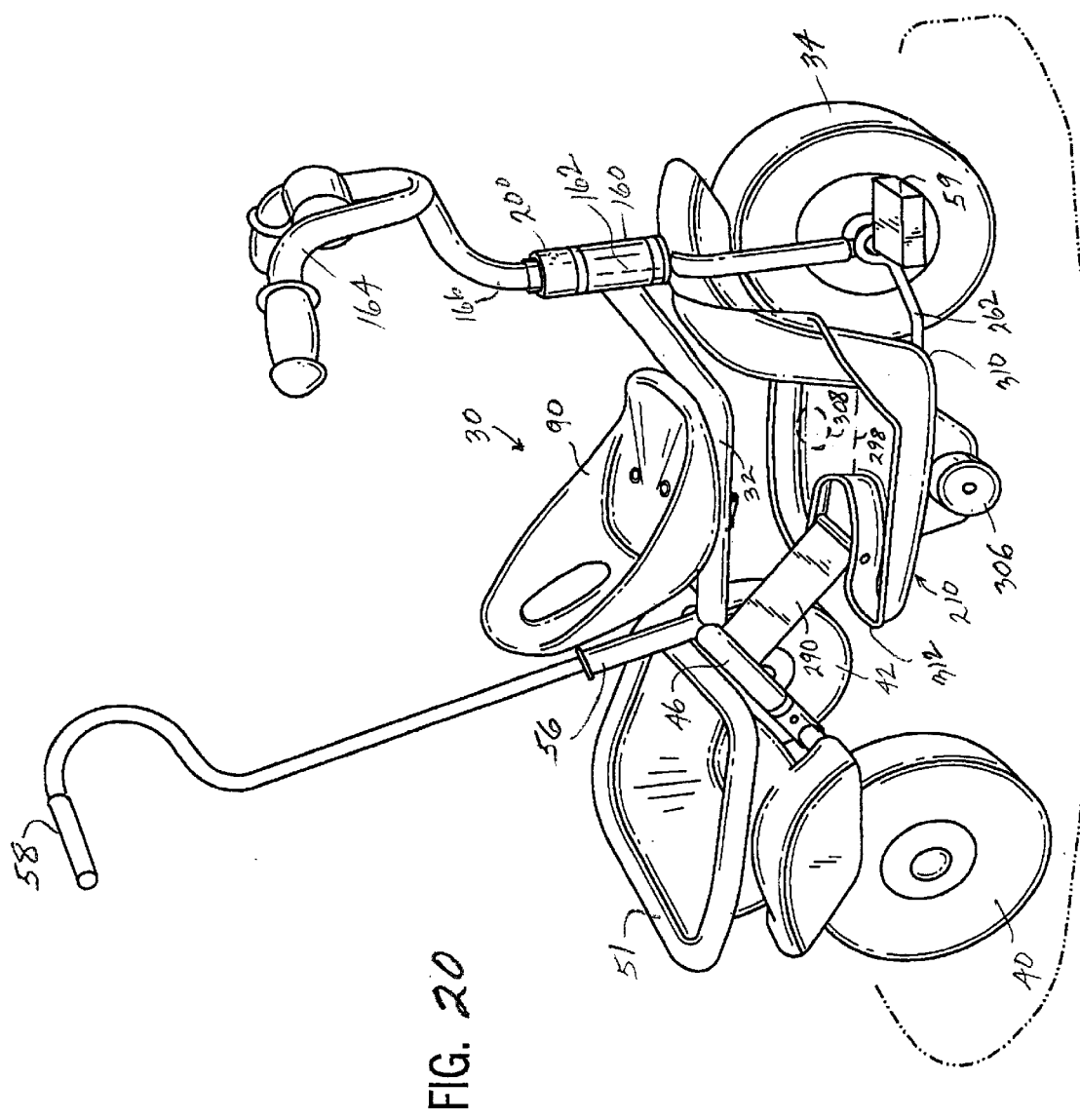

FIG. 20 is a perspective view of an assembled tricycle with footwell in accordance with the present invention.

Figure 21:
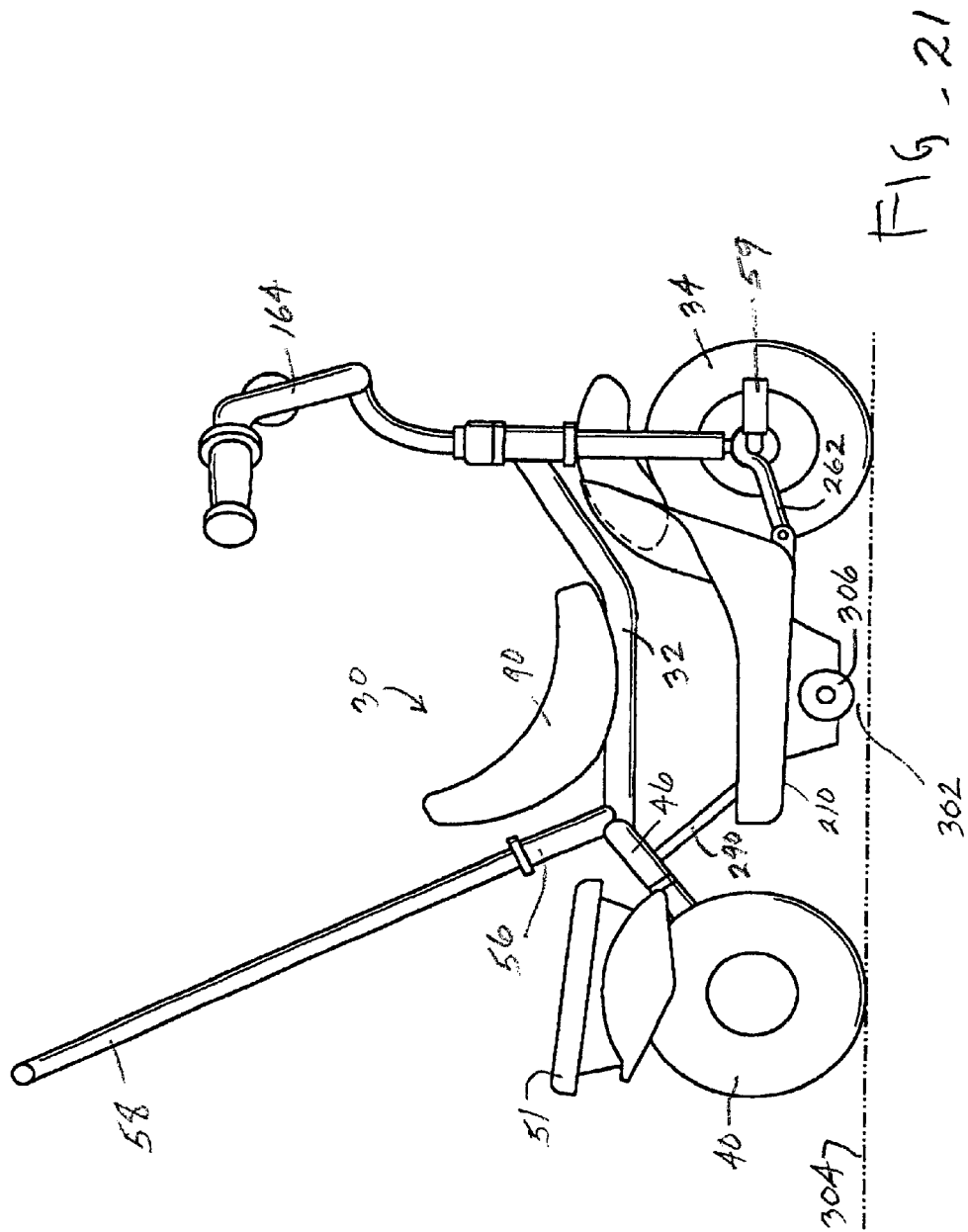

FIG. 21 is a side elevation view of the tricycle of FIG. 20.

Figure 22:
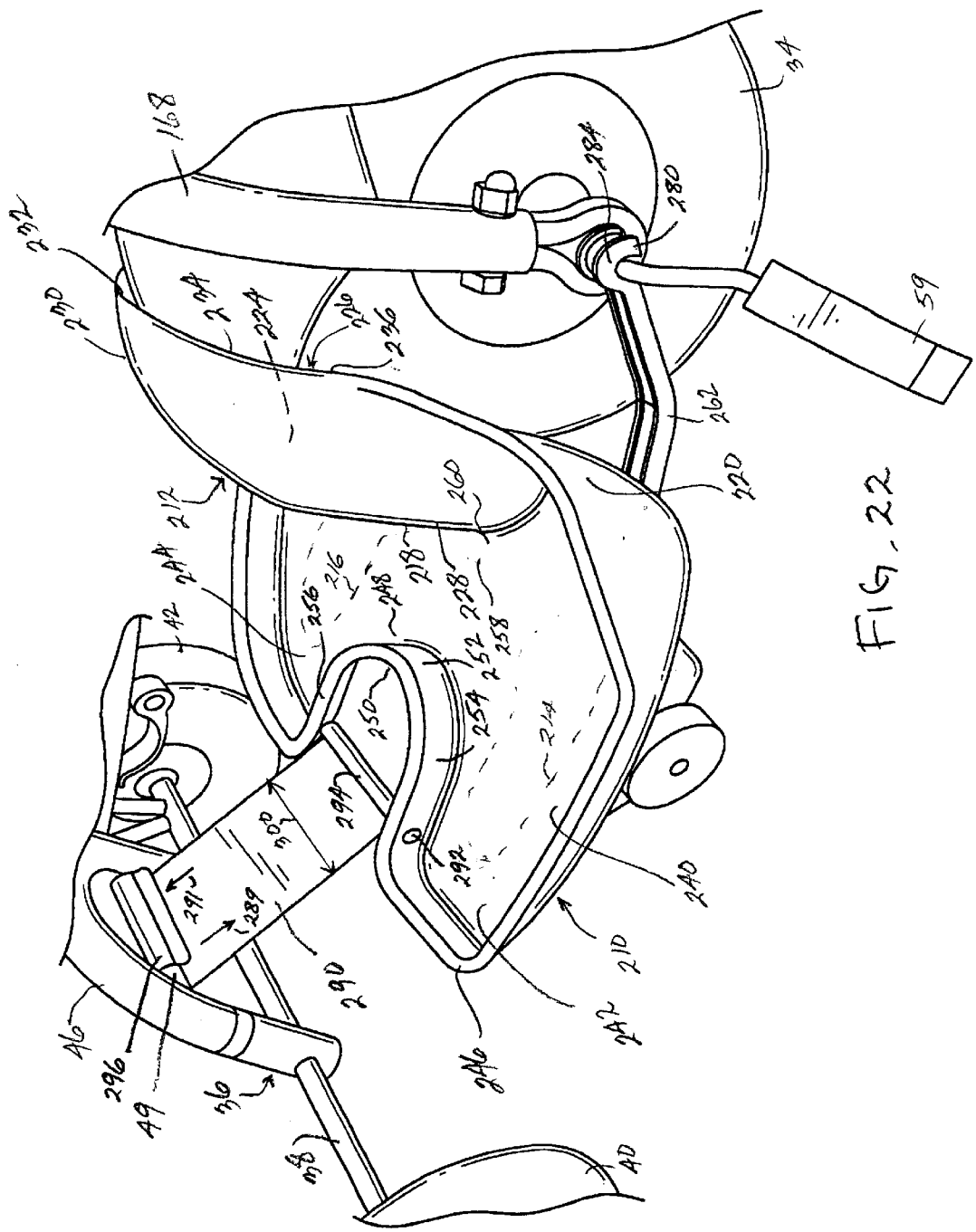

FIG. 22 is an enlarged perspective view of a portion of the structure of FIG. 20.

FIG. 23 is an enlarged perspective view of a portion of the structure of FIG. 22.

FIG. 24 is an enlarged view of a portion of the structure of FIG. 21.

FIG. 25 is a view taken along line 25—25 of FIG. 24.

DETAILED DESCRIPTION

Parent Application

Figure 1:
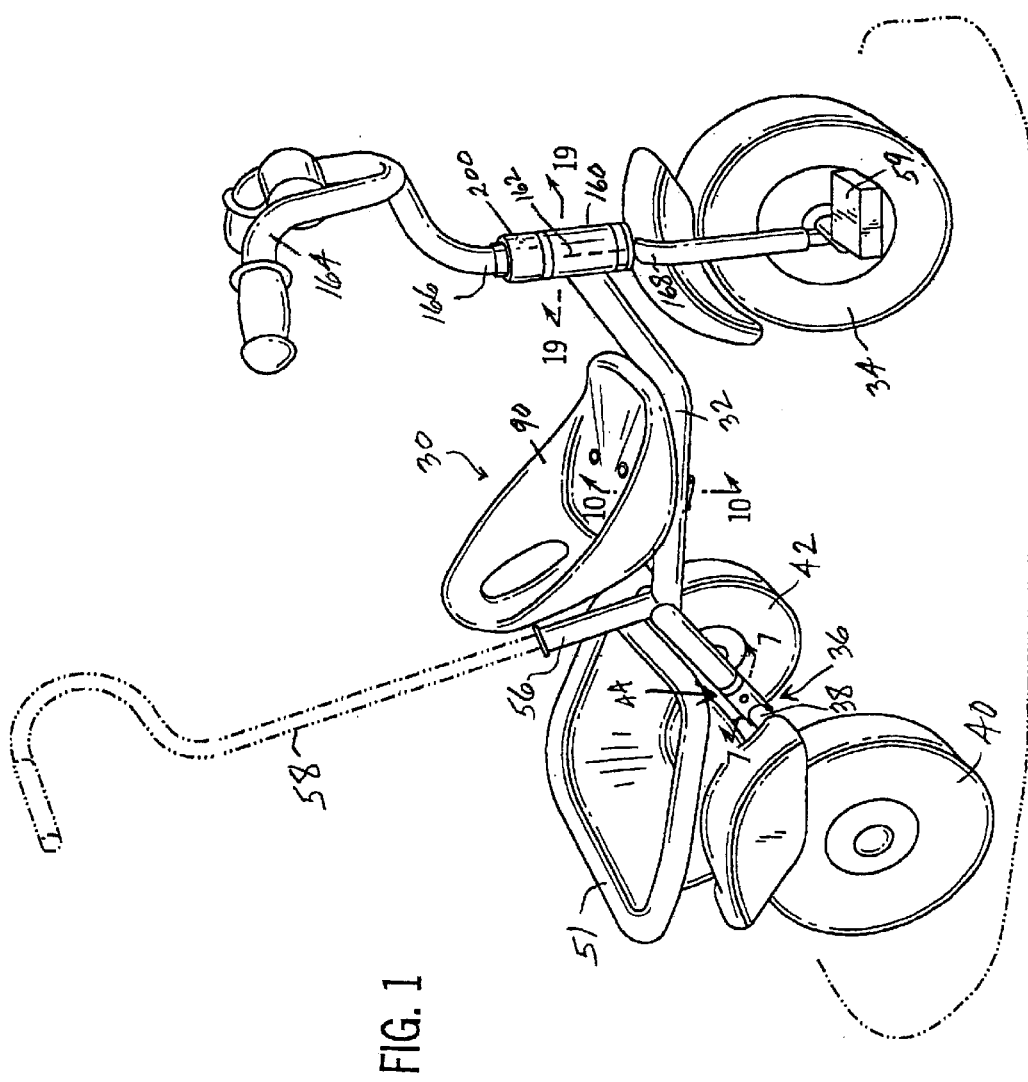
FIG. 1 is a perspective view of an assembled cycle in accordance with the above noted parent application.
Figure 2:
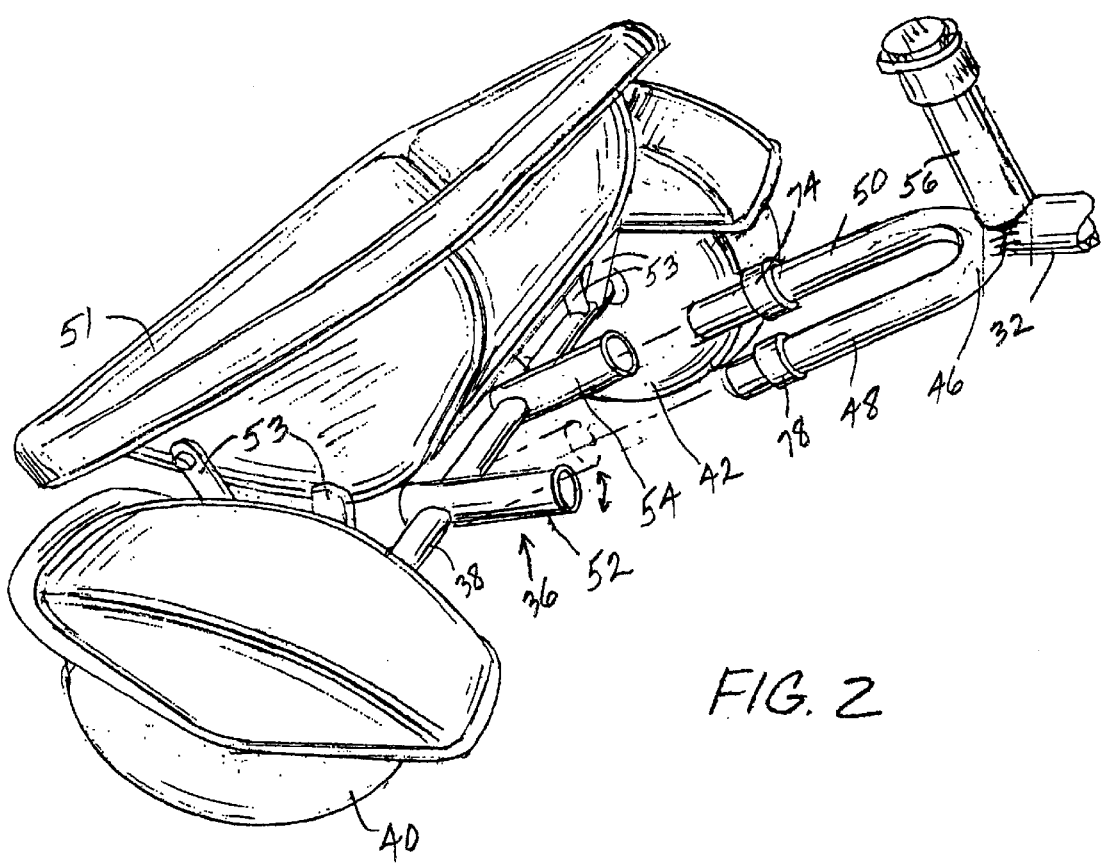
FIG. 2 is an exploded perspective view of a portion of the cycle of FIG. 1.
Figure 3:
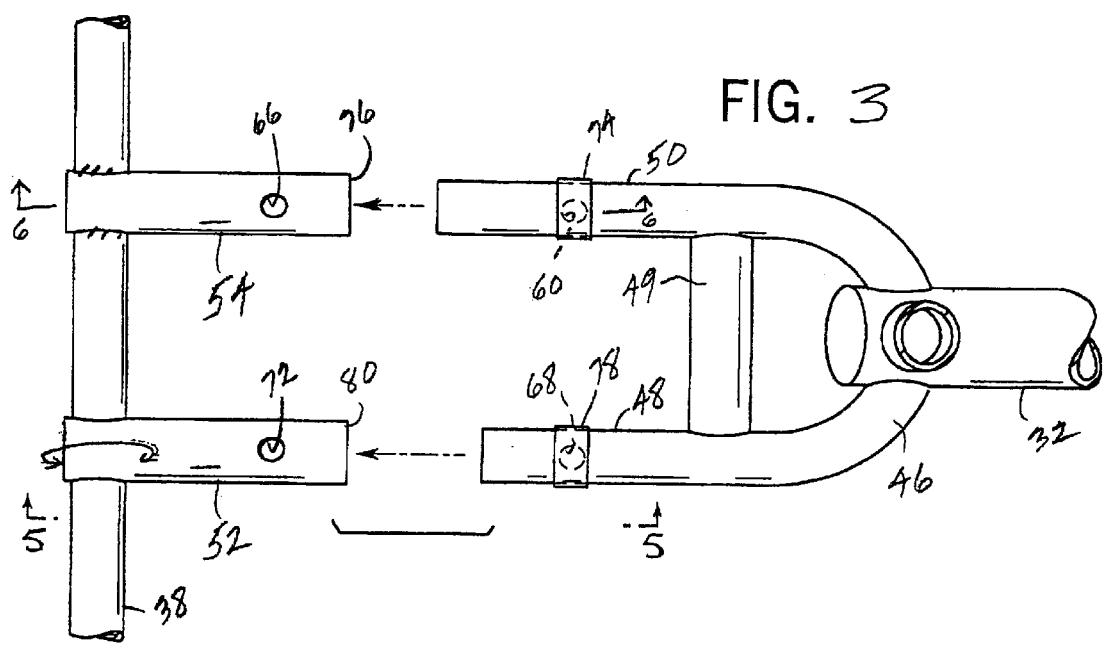
FIG. 3 is a top elevation view of a portion of the structure of FIG. 2 showing a pre-assembled condition.

FIG. 1 shows a tricycle 30 having a longitudinally extending frame 32 supporting a front wheel 34 and a subframe 36 including a rear axle 38 supporting a pair of laterally spaced rear wheels 40 and 42. A tool-free frame-to-subframe mounting assembly 44 mounts frame 32 to subframe 36 with an insertion motion, to be described, requiring no tools. The assembly mounts the frame to the subframe with snap-in insertion which is unidirectional, and once inserted is locked against withdrawal. A locking mechanism, to be described, permits the insertion and automatically locks the frame to the subframe upon such insertion, all without tools.

Frame 32 has a rear fork 46, FIGS. 2–5, having first and second legs 48 and 50 extending from frame 36 downwardly and rearwardly toward subframe 36. Subframe 36 has first and second arms 52 and 54 extending from the subframe upwardly and forwardly toward frame 32 and engaging legs 48 and 50, respectively, in inserted mating relation. Legs 48 and 50 and arms 52 and 54 provide the noted frame-to-subframe mounting assembly. The legs and arms are tubular members engaging each other with an insertion motion transverse to rear axle 38. The legs and arms engage in unidirectional rectilinear insertion relation with snap-in insertion. Leg 50 is longer than leg 48 such that leg 50 engages arm 54 before leg 48 engages arm 52. This is desirable for ease of installation because it is easier to align one pair of tubular members, e.g. 50 and 54, rather than two pairs simultaneously. To further facilitate such installation alignment, arm 52 is loosely mounted to rear axle 38 to permit relative rotation of arm 52 about axle 38 and also to allow arm 52 to be axially slidable along axle 38. In this manner, once leg 50 and arm 54 are aligned and partially inserted, arm 52 can readily be aligned with leg 48 for insertion. Arm 54 is rigidly mounted to rear axle 38. Legs 48 and 50 may have a cross brace 49 therebetween, FIGS. 3, 4, if desired for added rigidity. A basket or bucket 51 may be mounted on the rear axle if desired by supports such as 53 rigidly affixed to the axle. Frame 32 may have an upstanding tubular member 56 for removably receiving a push handle such as shown in phantom at 58, FIG. 1. A parent may insert handle 58 and push the tricycle for younger children. As the child grows, the parent can remove handle 58, and the child can propel the tricycle on his/her own by engaging pedals such as 59.

Figure 6:
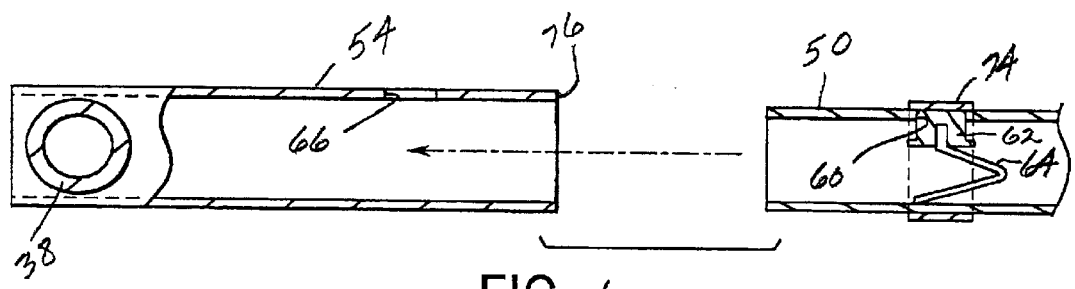
FIG. 6 is a view taken along line 6—6 of FIG. 3.

Leg 50 has an aperture 60, FIG. 6, with a locking button 62 biased by spring clip 64 to protrude therethrough. Arm 54 has an aperture 66. Upon the noted telescoping insertion, FIG. 7, aperture 60 aligns with aperture 66, and locking button 62 protrudes through aperture 60 into aperture 66, to lock leg 50 to arm 54 and prevent withdrawal thereof. Arm 48 likewise has an aperture 68, FIG. 3, with a locking button 70, FIG. 4, biased to protrude therethrough, and arm 52 has an aperture 72 aligned with aperture 68, FIG. 4, upon the noted telescoping insertion, whereby locking button 70 protrudes through aperture 68 and into aperture 72 upon such insertion, to lock leg 48 to arm 52 and prevent withdrawal thereof.

Figure 4:
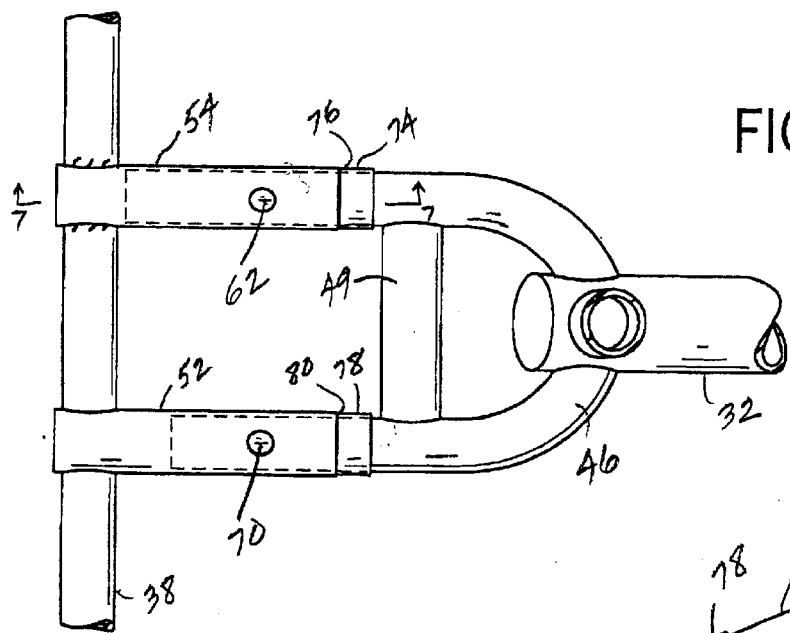
FIG. 4 is like FIG. 3 and illustrates an assembled condition.
Figure 5:
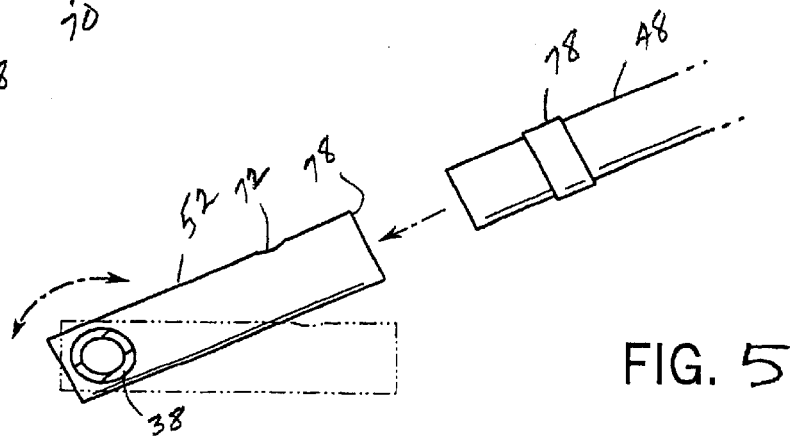
FIG. 5 is a view taken along line 5—5 of FIG. 3.
Figure 7:
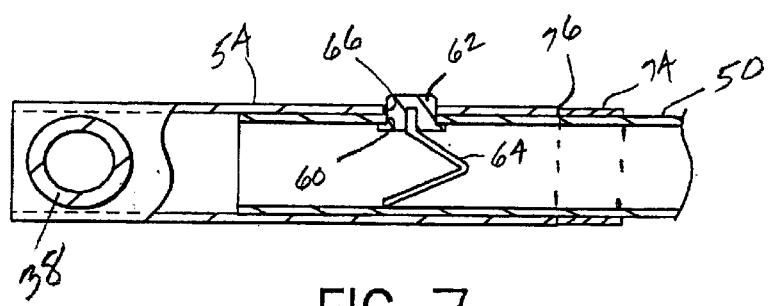
FIG. 7 is view taken along line 7—7 of FIG. 4.

Locking button 62 has a locking position, FIGS. 7, 4, protruding beyond aperture 60, and a release position recessed within aperture 60 against the bias of spring clip 64. Locking button 70 likewise has a locking position protruding beyond aperture 68, and a release position recessed within aperture 68 against the bias of a spring clip (not shown, but like spring clip 64). A pre-load member in the form of an annular collar 74, FIGS. 3, 6, on leg 50 holds locking button 62 in its release position. Collar 74 is engaged by axial end 76 of arm 54 during the noted telescoping insertion, to slide collar 74 rightwardly in FIGS. 3–7, to release locking member 62 to its locking position, i.e. to enable button 62 to move laterally outwardly (upwardly in FIG. 7) to protrude through aperture 66 of arm 54. A second pre-load member is provided by annular collar 78 on leg 48 and holding locking button 70 in its release position, and engaged by axial end 80 of arm 52 during the noted telescoping insertion, to slide collar 78 axially rightwardly in FIGS. 3, 4, to release locking button 70 to its locking position, i.e. to move laterally into aperture 72 of arm 52. The first pre-load member provided by annular collar 74 is slidable along leg 50 from a release position, FIGS. 3, 6, covering aperture 60, to a locking position, FIGS. 4, 7, uncovering aperture 60. The second pre-load member provided by collar 78 is axially slidable along leg 48 from a release position, FIG. 3, covering aperture 68, to a locking position, FIG. 4, uncovering aperture 68.

Frame 32, FIG. 1, supports a seat 90 for a rider. A tool-free seat-to-frame mounting assembly 92, FIGS. 8–12, removably and adjustably mounts seat 90 to frame 32 with an insertion motion 94, FIG. 9, along the direction of travel of cycle 30 and requiring no tools. The assembly includes a bracket 96, FIG. 8, on the underside of seat 90 and having a track 98 extending longitudinally along the direction of travel of the cycle. A locking member 100 is provided on frame 32 and is movable transversely of the noted travel direction between a clamping position, FIGS. 10, 12, engaging and clamping bracket 96 at track 98 to prevent longitudinal movement at 94 of seat 90 along frame 32, and a release position, FIG. 9, permitting such longitudinal movement of seat 90 along frame 32 and permitting removal of the seat from the frame. Bracket 96 has a longitudinal slot 102, FIGS. 8, 11, providing the noted track and having a lead-in open end 104. Locking member 100 on frame 32 includes a shank 106, FIGS. 9, 12, extending upwardly through slot 102 and having an upper flange 108. In preferred form, shank 106 is a bolt, and flange 108 is a threaded nut at the top of the bolt. Shank 106 is movable upwardly and downwardly between a lower locking position, FIGS. 10, 12, with flange 108 engaging bracket 96 in clamping relation, and an upper release position, FIG. 9, permitting bracket 96 to slide longitudinally at 94, with shank 106 extending transversely through longitudinal slot 102.

Figure 9:
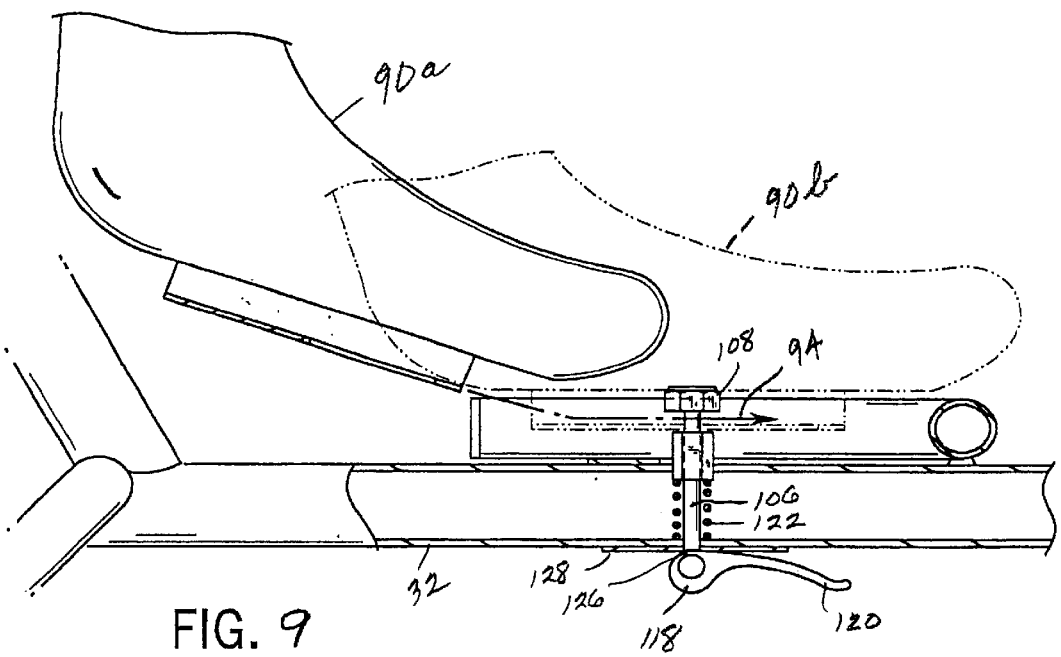
FIG. 9 is a side view partially in section of a portion of FIG. 1 illustrating a pre-assembled condition.
Figure 10:
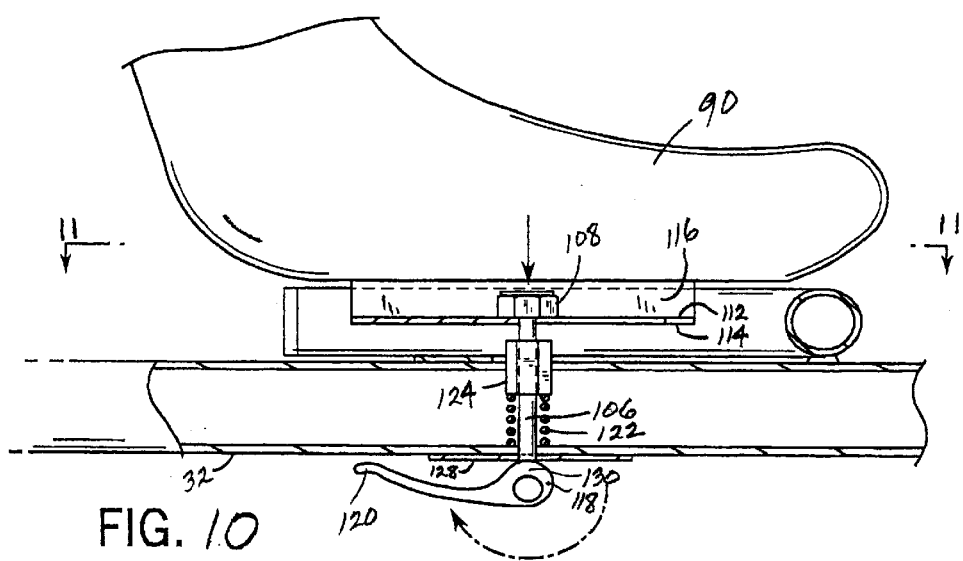
FIG. 10 is like FIG. 9 and shows an assembled condition.
Figure 11:
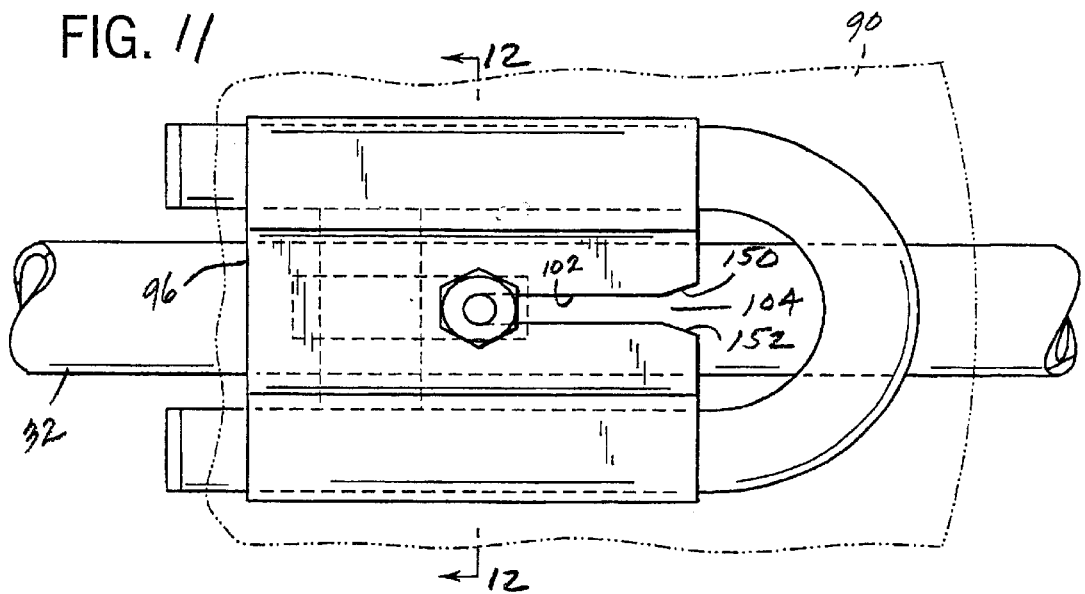
FIG. 11 is a view taken along line 11—11 of FIG. 10.
Figure 12:
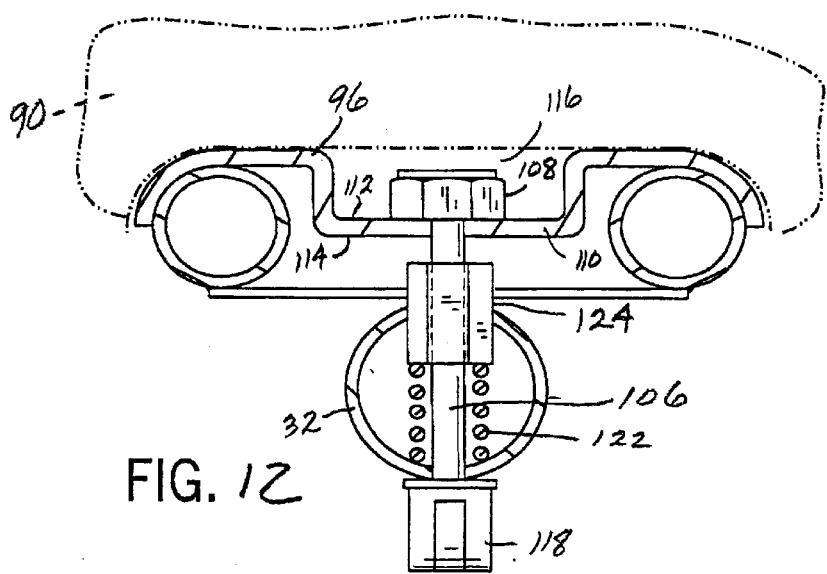
FIG. 12 is a view taken along line 12—12 of FIG. 11.

Bracket 96 includes a central plate 110, FIG. 8, spaced below seat 90 and having upper and lower surfaces 112 and 114, FIGS. 12 and 10. Upper surface 112 faces seat 90 and is spaced therefrom by a vertical gap 116. Lower surface 114 faces frame 32. The flange provided by nut 108 is in gap 116 and engages upper surface 112 in the noted locking position of the shank. Shank 106 extends downwardly through frame 32 and has a lower cam 118 below the frame and a manually engagable cam lever 120 for cammingly engaging and moving shank 106 between the noted upper and lower positions. A biasing member in the form of helical compression spring 122 within frame 32 biases shank 106 to its upper release position, FIG. 9. Spring 122 bears between the inner lower surface of tubular frame 32 and a nut 124 thread mounted or otherwise secured to shank or bolt 106. In the release position of the locking member shank, lever 120 is in the position shown in FIG. 9, with the thin part 126 of the cam engaging the underside of tubular frame 32 at plate 128. In the locking position of the locking member shank 106, lever 120 is in the position shown in FIG. 10, with the thick portion 130 of the cam engaging the underside of the tubular frame at plate 128.

Figure 8:
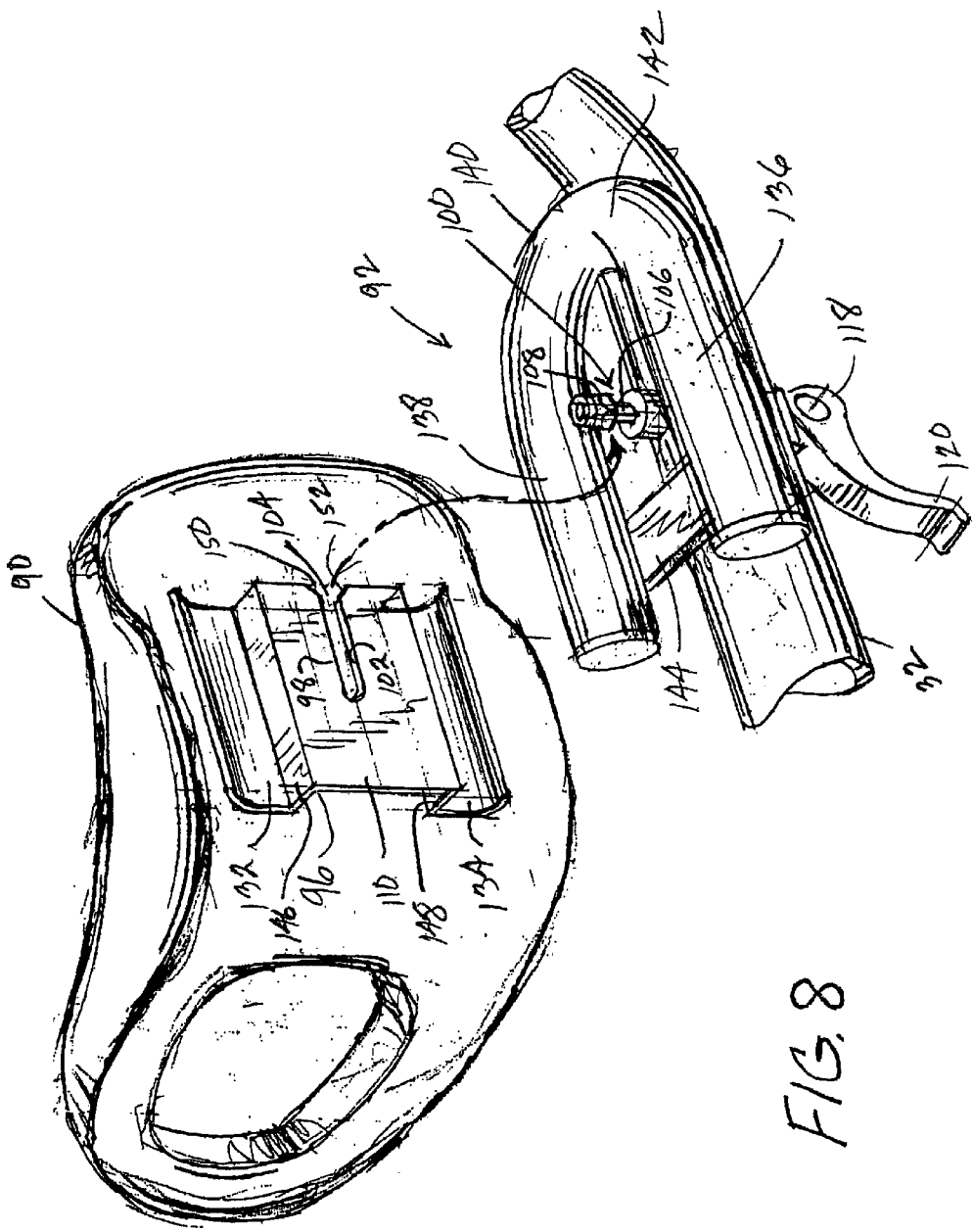
FIG. 8 is an exploded perspective view folded away of a portion of the cycle of FIG. 1.

Bracket 96 has a pair of downwardly facing longitudinally extending channels 132 and 134, FIG. 8, spaced on laterally opposite sides of slot 102. Frame 32 has a pair of upwardly facing longitudinally extending rails 136 and 138 on laterally opposite sides of shank 106 and receiving channels 132 and 134, respectively, and supporting bracket 96 for longitudinal movement therealong. A tubular U-shaped member 140 on frame 32 provides the noted rails. The U-shaped member has a pair of longitudinally extending tubular legs 136 and 138 joined by a laterally extending bight 142, and which may be further reinforced by a cross brace 144. Brace 96 has a central portion provided by the noted central plate 110 with slot 102 therein, and a pair of sidewalls 146 and 148 laterally spaced on opposite sides of slot 102 and extending from central portion 110 upwardly to channels 132 and 134, respectively. Lead-in open end 104 of slot 102 is beveled along a taper 150, 152, FIGS. 8, 11, to provide a widened entrance throat at 104 having a greater lateral width than slot 102 and guiding entry of shank 106 into slot 102 during the noted longitudinal insertion at 94 along the direction of travel of the cycle. Seat 90 is initially tipped and angled downwardly as shown at 90a in FIG. 9 to guide shank 106 into lead-in open end throat 104, and then the seat is slid forwardly as shown at 94 while the rear end of the seat is lowered, so that the seat slides horizontally forwardly to the position shown in FIG. 9 at dashed line 90b. The seat is adjusted fore-aft to a desired adjustment location, and then cam lever 120 is rotated clockwise from the position in FIG. 9 to the position in FIG. 10 to clampingly lock the seat in position.

Frame 32 has a headtube 160, FIG. 1, provided by a tubular member extending axially along a steering axis 162. Front handlebars 164 have a lower central stem provided by a tubular member 166, FIGS. 13–19, extending axially downwardly into headtube 160. Front wheel fork 168 supports front wheel 34 and has an upper central tubular yoke 170, FIGS. 13–19, extending axially upwardly into headtube 160 and engaging tubular stem 166 in telescoping relation. One of the stem and yoke, preferably yoke 170, has an externally extended portion 172 extending axially through and beyond headtube 160. A tool-free stem-to-yoke mounting assembly 174 external of headtube 160 mounts stem 166 to yoke 170 with an insertion motion, to be described, requiring no tools. The assembly step is a snap-in unidirectional insertion, and once inserted is locked against withdrawal.

Figure 18:
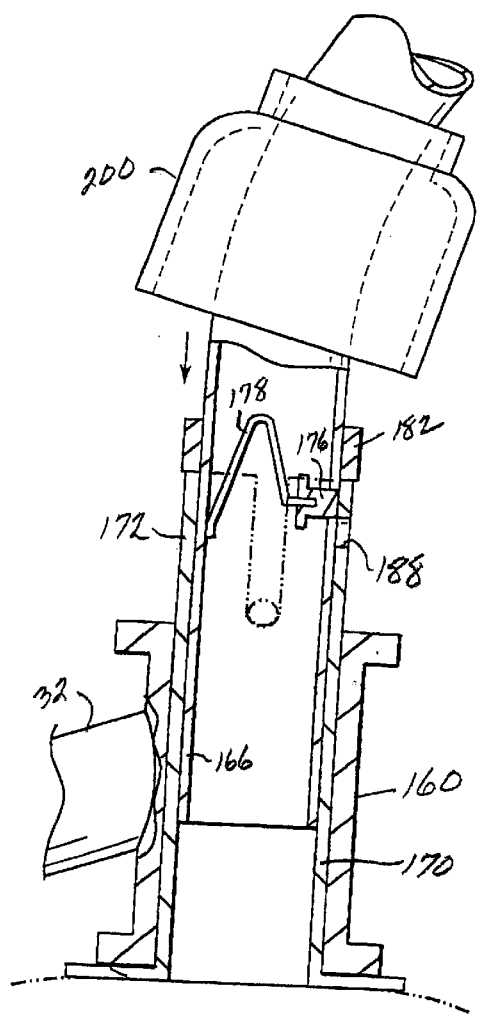
FIG. 18 is a view like FIG. 17 and illustrates the structure during assembly.
Figure 19:
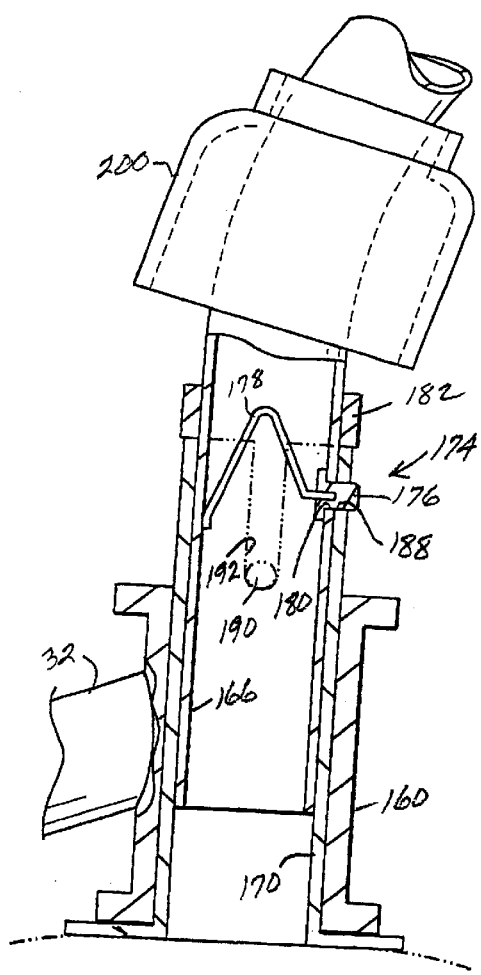
FIG. 19 is like FIG. 18 and illustrates the structure upon completion of assembly.

The tubular members of yoke 170 and stem 166 preferably engage each other in telescoping relation. A locking mechanism, to be described, preferably external of headtube 160, coacts between the stem and yoke and permits the noted insertion and locks the stem to the yoke to prevent withdrawal of the stem from the yoke, and also locks the stem and yoke against withdrawal from the headtube, all without tools. An anti-rotation mechanism, to be described, coacts between the stem and yoke and prevents relative rotation therebetween. One of the stem and yoke, preferably the stem, has a biased locking member in the form of a locking button 176, FIGS. 17–19, having a locking position, FIG. 19, and a release position, FIG. 17. Locking button 176 is biased by spring clip 178 to protrude through aperture 180 in the tubular sidewall of stem 166. A pre-load member or release band in the form of an annular collar 182 around tubular stem 166 holds locking button 176 in its release position recessed in aperture 180. Collar 182 is engaged by axial end 184 of externally extended portion 172 of tubular yoke 170 during the noted insertion. During such telescoping insertion, axial end 184 of yoke 170 engages and pushes collar 182 axially upwardly as shown in FIG. 18 to release locking pin 176 to snap laterally outwardly under the bias of spring clip 178 into aperture 188 in yoke 170, FIG. 19. This is the locking position, with locking member 176 engaging yoke 170 at aperture 188 to lock stem 166 to yoke 170. The tubular members providing stem 166 and yoke 170 also have mating detents 190 and 192, FIG. 13, axially slidable along each other during the noted telescoping insertion and providing the noted anti-rotation mechanism. The detents are provided by one or more open ended axially extending slots 192 in yoke 170, and one or more laterally extending pegs 190 on stem 166 extending laterally into respective slots 192 and axially slidable therealong. After insertion, the lower axial end 194 of headtube 160 rests on and is supported by front wheel fork yoke 168 at annular ring 196. Locking member 176 and the anti-rotation mechanism provided at peg 190 in slot 192 are external of the headtube and above the upper axial end 198 thereof and prevent withdrawal of stem 166 and yoke 170 from headtube 160. After the noted insertion, an outer protective cover sheath 200 is slid downwardly along stem 166 to cover the noted locking mechanism and anti-rotation mechanism.

The frame-to-subframe mounting assembly in combination with the seat-to-frame mounting assembly in combination with the stem-to-yoke mounting assembly provides simplified, quick assembly. Each step is a single insertion. The three steps may be performed in any desired sequence. The noted snap-in insertion desirably provides affirmative installation feedback by an audible and tactile click confirming alignment and snap-in engagement, and proper, successful installation.

Present Application

FIGS. 20–25 illustrate the present invention and use like reference numerals from above where appropriate to facilitate understanding.

FIG. 20 shows tricycle 30 having longitudinally extending frame 32 supporting front wheel 34, laterally spaced rear wheels 40, 42, and seat 90 for the rider. A protective footwell 210, preferably a molded plastic member, is removably mounted to the tricycle for supporting the feet of the rider. The front wheel has a pair of pedals 59, 57, FIGS. 20, 25. The footwell has a front shroud 212, FIG. 22, extending upwardly between the feet of the rider and the front pedals. The feet of the rider are schematically shown at 214 and 216 in FIG. 22. Front shroud 212 has an upstanding central wall 218 between a pair of right and left walls 220 and 222, FIGS. 22, 25, on laterally opposite sides of central wall 218. Central wall 218 is formed as a wheelwell around an aft portion of front wheel 34. Central wall 218 protects the legs and feet of the rider from front wheel 34. Right and left walls 220 and 222 protect the feet of the rider from pedals 59 and 57.

Central wall 218 has a forwardly facing concave surface 224, FIG. 24, defining a cavity 226 receiving front wheel 34 therein. Central wall 218 has an aft facing convex surface 228 defining a central barrier between the feet of the rider. Central wall 218 curves laterally and forwardly to forward portions blended into right and left walls 220 and 222. Central wall 218 has an upper hump portion 230 curved forwardly and spaced above front wheel 34. Hump portion 230 has a forward leading edge 232 curved laterally outwardly for example at 234, FIG. 22, and then extending downwardly for example at 236 and joining the noted right and left walls.

Footwell 210 has a lower floor 240, FIG. 22, extending aft from front shroud 212. Floor 240 has right and left foot-receiving portions 242 and 244 and an upstanding border wall 246 extending therearound for guiding and retaining the feet of the rider therein. Floor 240 has a central aft section 248 with a U-shape cut-out 250 for extending between the feet of the rider. U-shape cut-out 250 has a central laterally extending bight 252 and a pair of legs 254 and 256 extending aft from bight 252. Border fence 246 extends along U-shape cut-out 250. Floor 240 has a central forward section 258 with a U-shape 260 for extending between the feet of the rider. Front shroud 212 has the noted upstanding central wall 218 extending upwardly from U-shape 260. Front shroud 212 has the noted right and left walls 220 and 222 on laterally opposite sides of central wall 218. Border fence 246 blends into right and left walls 220 and 222 and central wall 218 at portions 236 and 234 of the noted forward leading edge 232 thereof.

A pair of right and left front support links 262 and 264, FIGS. 22, 24, 25 extend forwardly from footwell 210 on laterally opposite sides of front wheel 34 and are mounted to front wheel axle 266. Front wheel 34 is mounted at axle 266 to fork 168 of the frame 32. Links 262, 264 on front axle 266 prevent turning of front wheel 34 about its vertical steering axis 162, to provide a steering-lock blocking steering of the tricycle by the rider. The parent pushing the tricycle at push handle 58 now has control of the steering of the tricycle as a stroller and pushes down slightly on the handle to slightly raise the front wheel to facilitate steering. Right and left front support links 262 and 264 have aft ends 268 and 270 pivotally mounted to footwell 210 at trunions 272 and 274 in brackets 276 and 278 integrally formed with the footwell. Support links 262 and 264 have forward ends 280 and 282 pivotally mounted to front axle 266. Forward ends 280 and 282 are preferably in the form of a hook such as 284 hooked on front axle 266. The front axle has right and left cranks 286 and 288 extending transversely therefrom on laterally opposite sides of front wheel 34. Pedals 59 and 57 are mounted to cranks 286 and 288. Front support links 262 and 264 are mounted to front axle 266 laterally inboard of right and left cranks 286 and 288.

Frame 32 has an aft portion at rear fork 46, FIGS. 21, 22, supporting subframe 36, rear axle 38, and rear wheels 40 and 42. A rear support link 290, FIG. 22, extends from footwell 210 to aft frame portion 46 and is mounted thereto. Aft frame portion 46 has a support bar provided by cross brace 49 extending laterally thereacross. Footwell 210 has a support bar 292, FIG. 23, extending laterally thereacross between legs 254 and 256 of U-shape cut-out 250. Rear support link 290 is mounted to support bars 49 and 292. Link 290 has a forward lower end 294 curled around support bar 292 in a closed-loop to be permanently mounted thereto in pivotal relation. Aft upper end 296 of link 290 is partially curled around support bar 49 in open-loop pivotal relation in the form of a hook hooked on aft frame portion 46 at support bar 49 and insertable thereonto in snap-in relation in the direction shown at arrow 289, and removable therefrom in snap-out relation in the direction shown at arrow 291. Footwell 210 has a longitudinal centerline 298, FIG. 20, coincident with front wheel 34 and defining a longitudinal vertical centerline plane extending upwardly therefrom. Rear link 290 has a lateral extension span 300, FIG. 22, transversely crossing the noted centerline plane and having a laterally widened extension span width 300 stabilizing footwell 210 against right-left tilting in the event of uneven right-left foot pressure of the rider.

In the preferred embodiment, the front and rear support links provided by links 262, 264, 290 suspend footwell 210 therebetween slightly off the ground as shown at vertical gap 302, FIG. 21, above ground 304, and allowing a limited amount of vertical travel of footwell 210. The footwell has right and left laterally spaced lower wheels 306 and 308 normally suspended off the ground in the absence of weight in the footwell, for example as provided by the rider's feet, and engaging the ground for rolling therealong in response to a given amount of weight in the footwell. The wheels provide enhanced lateral stability when rolling along the ground. Even if the wheels do not engage the ground, enhanced lateral stability is still provided by the laterally stabilized mounting assembly provided by forward support links 262 and 264 and aft support link 290, including the wide lateral stance of the latter.

Links 262, 264, 290 provide a tool-free mounting assembly mounting protective footwell 210 to the tricycle. Snap-in insertion is provided by the noted hook arrangement. The tool-free mounting assembly includes the noted hooks at the forward ends 280 and 282 of the front links tool-free mounting forward end 310 of the footwell to the tricycle, and a third hook provided by aft end 296 of link 290 mounting aft end 312 of the footwell to the tricycle.

It is recognized that various equivalents, alternatives and modifications are possible within the scope of the appended claims.

What is claimed is:

1. In a tricycle having a longitudinally extending frame supporting a front wheel, a pair of laterally spaced rear wheels, and a seat for a rider, a protective footwell removably mounted to the tricycle and supporting the feet of a rider, wherein said front wheel has a pair of pedals, and said footwell has a front shroud portion extending upwardly between the feet of a rider and said pedals, wherein said front shroud has an upstanding central wall between a pair of right and left walls on laterally opposite sides of said central wall, said central wall being formed as a wheelwell around an aft portion of said front wheel, said central wall protecting the legs and feet of the rider from said front wheel, said right and left walls protecting the feet of the rider from said pedals.

2. The tricycle according to claim 1 wherein said central wall has a forwardly facing concave surface defining a cavity receiving said front wheel therein, and wherein said central wall has an aft facing convex surface defining a central barrier between the feet of the rider.

3. The tricycle according to claim 2 wherein said central wall curves laterally and forwardly along said convex surface to forward portions blended into said right and left walls.

4. The tricycle according to claim 3 wherein said central wall has an upper hump portion curved forwardly and spaced above said front wheel, said hump portion having a forward leading edge curved laterally outwardly and extending downwardly and joining said right and left walls.

5. In a tricycle having a longitudinally extending frame supporting a front wheel, a pair of laterally spaced rear wheels, and a seat for a rider, a protective footwell removably mounted to the tricycle and supporting the feet of a rider, wherein said front wheel has a pair of pedals, and said footwell has a front shroud portion extending upwardly between the feet of a rider and said pedals, wherein said footwell has a lower floor extending aft from said front shroud, wherein said floor has right and left foot-receiving portions and an upstanding border wall extending therearound for guiding and retaining the feet of the rider therein, wherein said floor has a central aft section with a U-shape cut-out for extending between the feet of the rider, said U-shape cut-out having a central laterally extending bight and a pair of legs extending aft from said bight, said border fence extending along said U-shape cut-out.

6. In a tricycle having a longitudinally extending frame supporting a front wheel, a pair of laterally spaced rear wheels, and a seat for a rider, a protective footwell removably mounted to the tricycle and supporting the feet of a rider, wherein said front wheel has a pair of pedals, and said footwell has a front shroud portion extending upwardly between the feet of a rider and said pedals, said footwell has a lower floor extending aft from said front shroud, wherein said floor has right and left foot-receiving portions and an upstanding border wall extending therearound for guiding and retaining the feet of the rider therein, wherein said floor has a central forward section with a U-shape for extending between the feet of the rider, said front shroud has an upstanding central wall extending upwardly from said U-shape, said front shroud has right and left walls on laterally opposite sides of said central wall, said border fence blends into said right and left walls and said central wall.

7. In a tricycle having a longitudinally extending frame supporting a front wheel, a pair of laterally spaced rear wheels, and a seat for a rider, a protective footwell removably mounted to the tricycle and supporting the feet of a rider, and comprising front and rear support links mounting said footwell to said tricycle, wherein said front and rear support links suspend said footwell therebetween with a limited amount of vertical travel, and wherein said footwell has one or more lower wheels normally suspended off the ground in the absence of weight on said footwell, and engaging the ground for rolling therealong in response to a given amount of weight on said footwell.

8. In a tricycle having a longitudinally extending frame supporting a front wheel, a pair of laterally spaced rear wheels, and a seat for a rider, a protective footwell removably mounted to the tricycle and supporting the feet of a rider, wherein said footwell has right and left laterally spaced lower wheels engageable with the ground for enhanced lateral stability.

9. In a tricycle having a longitudinally extending frame supporting a front wheel, a pair of laterally spaced rear wheels, and a seat for a rider, a protective footwell removably mounted to the tricycle and supporting the feet of a rider, wherein said front wheel has a front axle mounted to said frame, and comprising a pair of right and left support links extending forwardly from said footwell on laterally opposite sides of said front wheel and mounted to said front axle and preventing turning of said front wheel about a vertical axis, to provide a steering-lock blocking steering of the tricycle by the rider.

10. The tricycle according to claim 9 wherein each of said right and left front support links has an aft end mounted to said footwell, and has a forward end removably mounted to said front axle, at least one of said ends being pivotally mounted to allow vertical travel of said footwell.

11. The tricycle according to claim 9 wherein each of said right and left front support links has a forward end in the form of a hook hooked on said front axle.

12. The tricycle according to claim 9 wherein said front axle has right and left cranks extending transversely therefrom on laterally opposite sides of said front wheel, said pedals being mounted to said cranks, and wherein said right and left front support links are mounted to said front axle laterally inboard of said right and left cranks, respectively.

13. In a tricycle having a longitudinally extending frame supporting a front wheel, a pair of laterally spaced rear wheels, and a seat for a rider, a protective footwell removably mounted to the tricycle and supporting the feet of a rider, wherein said frame has an aft portion supporting said rear wheels, and comprising a rear link extending from said footwell to said aft frame portion and mounted thereto.

14. The tricycle according to claim 13 wherein said aft frame portion has a first support bar extending laterally thereacross, said footwell has a second support bar extending laterally thereacross, said rear link is mounted to said first and second support bars, said footwell has a longitudinal centerline coincident with said front wheel and defining a longitudinal vertical centerline plane, and wherein said rear link has a lateral extension span transversely crossing said centerline plane and having a laterally widened extension span width stabilizing said footwell against right-left tilting in the event of uneven right-left foot pressure of the rider.

15. The tricycle according to claim 13 wherein said rear link has a first end mounted to said footwell, and has a second end removably mounted to said aft frame portion, at least one of said ends being pivotally mounted to allow vertical movement of said footwell.

16. The tricycle according to claim 13 wherein said rear link has an end in the form of a hook hooked on said aft frame portion.

17. In a tricycle having a longitudinally extending frame supporting a front wheel, a pair of laterally spaced rear wheels, and a seat for a rider, a tool-free mounting assembly mounting a protective footwell to said tricycle requiring no tools, and wherein said toll-free mounting assembly mounts said footwell to said tricycle with snap-in insertion, wherein said footwell has a forward end and an aft end, and said tool-free mounting assembly comprises first and second hooks tool-free mounting one of said ends to said tricycle, and a third hook tool-free mounting the other of said ends to said tricycle.

18. In a tricycle having a longitudinally extending frame supporting a front wheel, a pair of laterally spaced rear wheels, and a seat for a rider, a laterally stabilized mounting assembly mounting a protective footwell to said tricycle in laterally stabilized relation, wherein said footwell has a longitudinal centerline coincident with said front wheel and defining a longitudinal vertical centerline plane, and wherein said laterally stabilized mounting assembly comprises a support link supporting said footwell from said tricycle and having a lateral extension span transversely crossing said centerline plane and having a laterally widened extension span width stabilizing said footwell against right-left tilting.

19. In a tricycle having a longitudinally extending frame supporting a front wheel, a pair of laterally spaced rear wheels, and a seat for a rider, a laterally stabilized mounting assembly mounting a protective footwell to said tricycle in laterally stabilized relation, wherein said footwell has a longitudinal centerline coincident with said front wheel and defining a longitudinal vertical centerline plane, and wherein said laterally stabilized mounting assembly comprises first, second and third support links supporting said footwell from said tricycle, said first and second support links being laterally spaced on laterally opposite sides of said centerline plane, said third support link having a lateral extension span transversely crossing said centerline plane and having a laterally widened extension span width.

20. In a tricycle having a longitudinally extending frame supporting a front wheel, a pair of laterally spaced rear wheels, and a seat for a rider, a laterally stabilized mounting assembly mounting a protective footwell to said tricycle in laterally stabilized relation, wherein said footwell has a longitudinal centerline coincident with said front wheel and defining a longitudinal vertical centerline plane, and wherein said laterally stabilized mounting assembly comprises a set of support links supporting said footwell from said tricycle in pivotal relation allowing vertical travel of said footwell, and a pair of lower wheels on said footwell spaced on laterally opposite sides of said centerline plane.

21. A tool-free assembly method for a tricycle having a longitudinally extending frame supporting a front wheel, a pair of laterally spaced rear wheels, and a seat for a rider, comprising mounting a protective footwell to the tricycle without tools, and comprising providing said footwell with a forward end and an aft end, and mounting said footwell to said tricycle with two hooks at said forward end and one hook at said aft end.

22. The method according to claim 21 comprising mounting said aft end of said footwell to said tricycle at said one hook with snap-in insertion.

23. A tool-free assembly method for a tricycle having a longitudinally extending frame supporting a front wheel, a pair of laterally spaced rear wheels, and a seat for a rider, comprising mounting a protective footwell to the tricycle without tools, and comprising mounting said footwell to said tricycle in laterally stabilized relation with a laterally stabilized mounting assembly, and comprising providing said footwell with a forward end and an aft end, and mounting said footwell to said tricycle with first and second support links at one of said ends, and a third support link at the other of said ends, wherein said footwell has a longitudinal centerline coincident with said front wheel and defining a longitudinal vertical centerline plane, and comprising laterally spacing said first and second links on laterally opposite sides of said centerline plane, and laterally spanning said centerline plane with said third link having a laterally widened extension span width transversely crossing said centerline plane.

24. A tool-free assembly method for a tricycle having a longitudinally extending frame supporting a front wheel, a pair of laterally spaced rear wheels, and a seat for a rider, comprising mounting a protective footwell to the tricycle without tools, and comprising suspending said footwell from said tricycle with a set of support links in pivotal relation allowing vertical travel of said footwell, and providing a pair of laterally spaced lower wheels on said footwell.

* * * * *